United States Patent
Gosselin et al.

US009843671B2

(10) Patent No.: US 9,843,671 B2
(45) Date of Patent: *Dec. 12, 2017

(54) DELIVERY OF CALLER IDENTIFICATION DATA TO A MOBILE DEVICE USING APPLICATION DIRECTED SHORT MESSAGING SERVICE

(71) Applicant: Cequint, Inc, Seattle, WA (US)

(72) Inventors: Mark H. Gosselin, Seattle, WA (US); Michael Luna, San Jose, CA (US)

(73) Assignee: Cequint, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/622,466

(22) Filed: Feb. 13, 2015

(65) Prior Publication Data
US 2015/0181028 A1   Jun. 25, 2015

Related U.S. Application Data

(63) Continuation of application No. 12/349,679, filed on Jan. 7, 2009, now Pat. No. 8,983,540.

(60) Provisional application No. 61/099,112, filed on Sep. 22, 2008.

(51) Int. Cl.
| | |
|---|---|
| H04M 3/42 | (2006.01) |
| H04W 4/16 | (2009.01) |
| H04W 4/12 | (2009.01) |
| H04W 68/00 | (2009.01) |

(52) U.S. Cl.
CPC ... *H04M 3/42042* (2013.01); *H04M 3/42382* (2013.01); *H04W 4/16* (2013.01); *H04M 2203/654* (2013.01); *H04M 2207/18* (2013.01); *H04W 4/12* (2013.01); *H04W 68/00* (2013.01)

(58) Field of Classification Search
None
See application file for complete search history.

(56) References Cited

U.S. PATENT DOCUMENTS

| 7,634,256 | B2 * | 12/2009 | Sherman | H04M 3/48 455/412.2 |
|---|---|---|---|---|
| 7,756,259 | B2 * | 7/2010 | Martin | H04W 4/16 379/142.04 |
| 7,796,998 | B1 * | 9/2010 | Zellner | H04M 3/42229 370/352 |
| 7,933,392 | B1 * | 4/2011 | Hannan | G06Q 30/0203 379/111 |
| 8,447,285 | B1 * | 5/2013 | Bladon et al. | 455/414.4 |
| 2005/0195954 | A1 * | 9/2005 | Klein | H04M 3/42374 379/201.04 |
| 2008/0242293 | A1 * | 10/2008 | Gosselin | H04M 3/42042 455/425 |

\* cited by examiner

*Primary Examiner* — Suhail Khan
(74) *Attorney, Agent, or Firm* — Lowe Graham Jones PLLC

(57) ABSTRACT

Caller name (CNAM) query results obtained from a traditional CNAM service are sent during call processing on a carrier network to the subscriber's mobile handset over a Short Message Service (SMS) channel on a mobile carrier network. A call page is received at a network carrier associated with a recipient of the received call page. A caller name (CNAM) query is performed, and the result of the performed CNAM query is sent to the recipient device before sending the call page to the recipient device. The CNAM query result is displayed on a display of the recipient device.

19 Claims, 2 Drawing Sheets

DELIVERY OF CALLER IDENTIFICATION DATA TO A MOBILE DEVICE USING APPLICATION DIRECTED SHORT MESSAGING SERVICE

PRIORITY CLAIM

This application is a continuation of U.S. application Ser. No. 12/349,679 filed Jan. 7, 2009 which claims the benefit of U.S. Provisional Application Ser. No. 61/099,112 filed Sep. 22, 2008, the contents of which are hereby incorporated by reference.

BACKGROUND OF THE INVENTION

On wireless networks, certain mobile devices are not enabled to receive CNAM (CNAM is an online information service providing caller name ID to telecommunications providers) caller ID display text information, and certain carrier network mobile switching centers (MSCs) are not CNAM transport-capable. Thus, CNAM query results from the carrier cannot be provided to the mobile device in the call page.

Other handset initiated communication facilities, such as SDB (Short Data Burst)/DOS (Data Over Signaling) on Code Division Multiple Access (CDMA) networks may be unavailable after the call page has been sent. Certain Global System for Mobile Communications (GSM) networks have similar limitations.

SUMMARY OF THE INVENTION

This invention delivers caller name (CNAM) query results obtained from a traditional CNAM service during call processing on a carrier network to the subscriber's mobile handset over a Short Message Service (SMS) channel on a mobile carrier network.

In an example method a call page is received at a network carrier associated with a recipient of the received call page. A caller name (CNAM) query is performed, then the result of the performed CNAM query is sent to the recipient device via SMS before sending the call page to the recipient device to initiate a call. The CNAM query result is displayed on a display of the recipient device.

In one aspect of the invention, a data message is sent to the recipient device using a Short Message Service Center (SMSC). The data message includes the result of the performed CNAM query.

In another aspect of the invention, a confirmation is generated if the sent data message has been received and the call page is released to the recipient device after generation of the confirmation.

In still another aspect of the invention, the CNAM query includes searching for CNAM information in a Line Information Database (LIDB) using caller identification (CID) included with the call page.

These and other examples of the invention will be described in further detail below.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
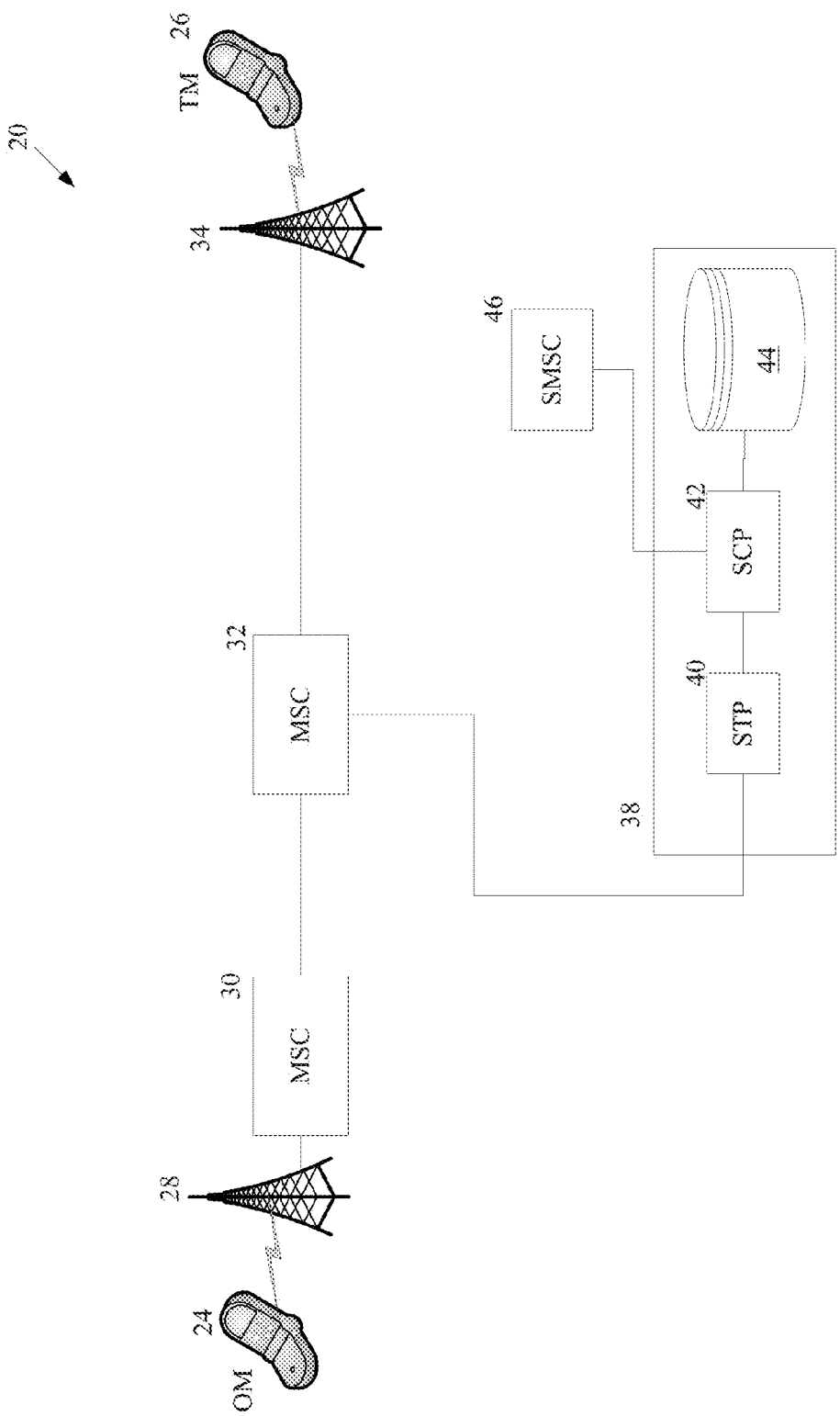
FIG. 1 illustrates architecture of an example system formed in accordance with an embodiment of the present invention.

FIG. 1 is a schematic diagram of an example system 20 that performs an improved caller name (CNAM) process. The system 20 includes a call originating device (handset OM) 24, a call originating base station (BS) 28, an originating carrier (a first Mobile Switching Center (MSC)) 30, a terminating carrier (a second MSC) 32, terminating carrier components 38, a terminating BS 34, a terminating carrier short message service center (SMSC) 46, and a terminating handset 26 (TM).

The present invention suspends a call page at the network level (the second MSC 32), processes a CNAM query at the carrier components 38, and delivers the CNAM query results to the subscriber's mobile device (the terminating handset 26) via an application directed SMS sent via the terminating carrier's messaging gateway (the SMSC 46) and the terminating BS 34.

The carrier components 38 include a Service Transfer Point (STP) 40 and a Service Control Point (SCP) 42 that provides a CNAM service using a Line Information Database (LIDB) 44. After the call page is suspended, a CNAM request is sent to the SCP 42 via the STP 40. The SCP 42 queries the LIDB 44. If a result of the query is found, the SCP 42 instructs the carrier SMSC 46 to send an SMS message to the terminating handset 26. The SMS message includes the CNAM query result. Then the CNAM components 38 instruct the second MSC 32 to release the call page to the terminating handset 26.

After the terminating handset 26 receives the call page via the terminating BS 34 and the CNAM information via the terminating BS 34 and the SMSC 46, the CNAM information is displayed with the originating caller number (CID).

Figure 2:
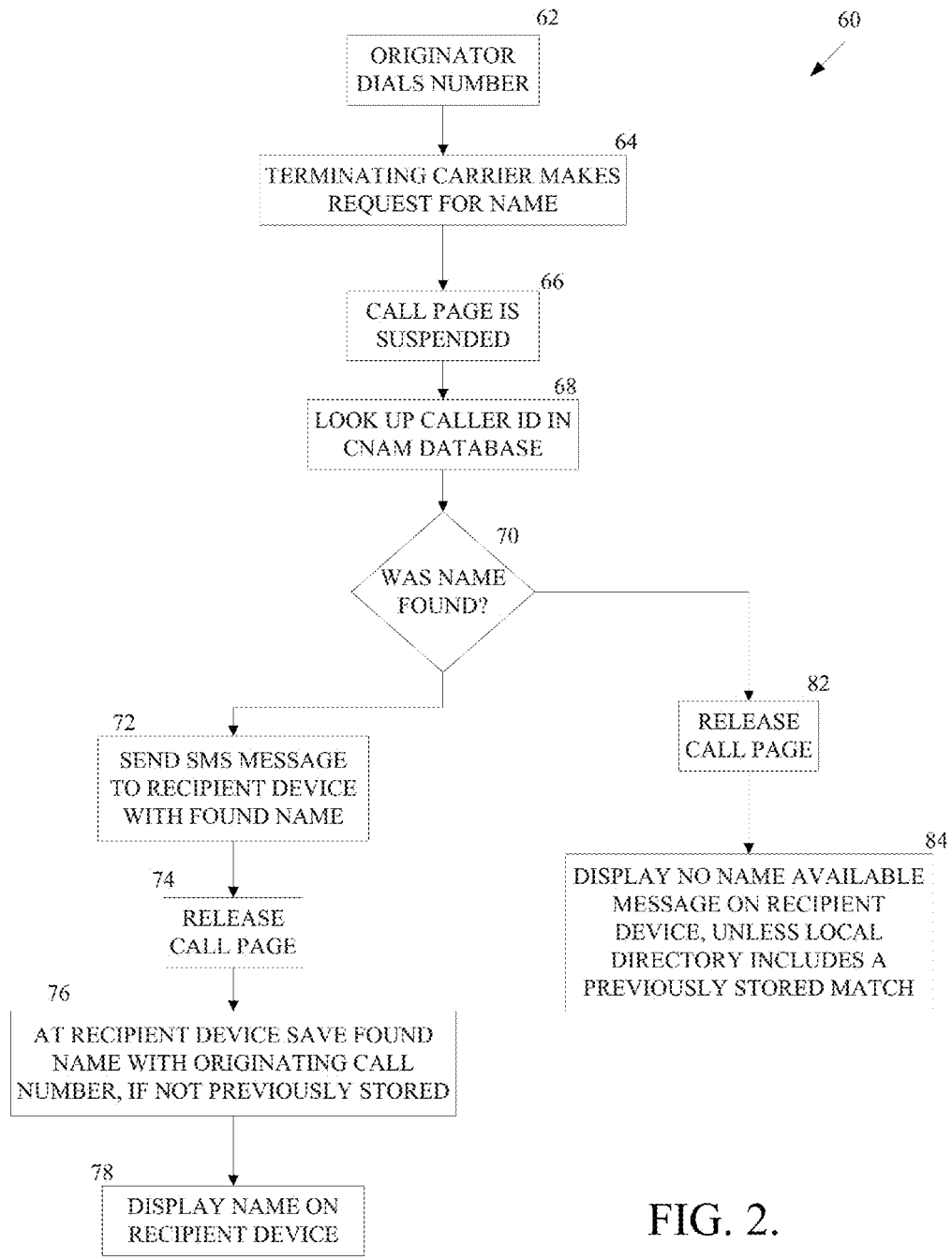
FIG. 2 illustrates a flow diagram of example process performed by the system of FIG. 1.

FIG. 2 illustrates an example process 60 that will deliver caller name information (CNAM) to the subscriber on the first call, other than traditional in-network CNAM sending (CID, Name) in the display text field of the call page.

First, at a block 62, an originating caller dials a number for a subscriber. The incoming call page is received at a Network Control Point (NCP) (i.e. the MSC 32).

The MSC 32 begins a CNAM query to obtain caller information from the LIDB 44, based on caller's CID (64, 68, 104, 106, 108). At a block 66, the SCP 42 and MSC 32 suspend the call page during the CNAM query. At a block 70, the CNAM query result is returned to the SCP 42 from the CNAM service LIDB 44. The CNAM result (typically, compressed text containing the caller name and CID) is delivered by the carrier SMSC 46 to the BS 34 and the mobile device 26 via an application directed SMS, see block 72. Then, at a block 74, after notification of SMS receipt from the SMSC 46 or expiration of a time limit, the SCP 42 instructs the MSC 32 to release the call page. The carrier MSC 32 sends the call page to the subscriber's mobile device/base station (26, 34). The subscriber's mobile device 26 receives the call page. The device 26 includes a local application that displays related CNAM information that was received in the SMS message (i.e 'John Doe 206-555-1212'), see block 78.

In one embodiment, the device 26 includes a mobile client application that stores the contents of the received SMS message in the contact directory of the device 26, see block 76. Referencing the previously filed application, the contact list may be used to filter CNAM queries for those phone numbers already known to the TM subscriber.

When the mobile device 26 receives the incoming call, the contact information is retrieved from the contact directory and displays caller's number and name during incoming call sequence.

In another embodiment, the SMS message content is held in temporary memory on the mobile device 26. When the mobile device 26 receives the incoming call page, the mobile device 26 retrieves contact information from the temporary memory and displays the caller's number and name during an incoming call sequence.

If no name was found in the CNAM query of the LIDB 44, a "null" output is produced. The MSC 32 is instructed to release the call page (82) and that a "null" situation has occurred. The system may at that point choose to send a blank caller information result in the call page text display field, or to send no caller information result at all. When the call page is received at the device 26 and either "null" information is included with the call page or with an SMS message or no SMS message was received, no name is displayed unless the local memory of the device 26 includes a name associated with the call page (84). The CID in the call page will be received and displayed in the caller ID text display field, in either case.

While a traditional query to a CNAM SCP suspends the call page in the literal sense, other network facilities may be used to effectively accomplish the same result. Whether the call page is literally suspended, delayed, or the query is placed early enough in the process with sufficient time to receive a result and send a SMS, the goal is the same: to have the SMS arrive at the handset before the call page. This permits first-call caller identification.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
    receiving an incoming call page at a network carrier associated with a recipient of the received incoming call page;
    performing a caller name (CNAM) query at the network carrier after receipt of the same incoming call page;
    sending a result of the performed CNAM query to a recipient device as a Short Message Service (SMS) message before sending the same incoming call page to the recipient device; and
    receiving, by the recipient device, the SMS message and storing the result from the SMS message in a contact directory;
    after receiving the SMS message and after storing the result from the SMS message in the contact directory, receiving the same incoming call page on the recipient device and, when the incoming call page is received by the recipient device, retrieving the result from the contact directory and displaying the result as part of an incoming call sequence for the same incoming call page.

2. The method of claim 1, wherein sending the result comprises sending a data message to the recipient device using a Short Message Service Center (SMSC), the data message includes the result of the performed CNAM query.

3. The method of claim 2, further comprising displaying the CNAM query result on a display of the recipient device, the recipient device not being CNAM enabled.

4. The method of claim 2, further comprising:
    receiving confirmation that the sent data message has been received; and
    releasing the same incoming call page to the recipient device after receipt of the confirmation.

5. The method of claim 1, wherein performing the CNAM query comprises searching for CNAM information in a Line Information Database (LIDB) using caller identification (CID) included with the same incoming call page.

6. The method of claim 1, further comprising storing the result of the performed CNAM query on the recipient device.

7. The method of claim 1, further comprising filtering out CNAM queries based on a directory of numbers already known to a receiving subscriber.

8. A system comprising:
    a means for receiving an incoming call page associated with a recipient of the received incoming call page;
    a means for performing a caller name (CNAM) query at a network carrier after receipt of the same incoming call page;
    a means for sending a result of the performed CNAM query to a recipient device as a Short Message Service (SMS) message;
    a means for sending the same incoming call page to the recipient device after the result has been sent; and
    a means for receiving and displaying the result of the CNAM query from the SMS message when the same incoming call page is received on the recipient device as part of an incoming call sequence on the recipient device after receiving the SMS message and after storing the result from the SMS message in a contact directory.

9. The system of claim 8, wherein the means for sending sends a data message to the recipient device using a Short Message Service Center (SMSC), the data message includes the result of the performed CNAM query.

10. The system of claim 8, further comprising a means for displaying the CNAM query result at the recipient device.

11. The system of claim 8, further comprising:
    a means for receiving confirmation that the sent data message has been received; and
    a means for releasing the same incoming call page to the recipient device after receipt of the confirmation.

12. The system of claim 8, wherein the means for performing the CNAM query comprises a means for searching for CNAM information in a Line Information Database (LIDB) using caller identification (CID) included with the same incoming call page.

13. The system of claim 8, further comprising a means for storing the result of the performed CNAM query on the recipient device.

14. A system comprising:
    a terminating carrier configured to receive an incoming call page associated with a recipient of the received incoming call page; and
    a component of the terminating carrier configured to perform a caller name (CNAM) query after receipt of the same incoming call page, send a result of the performed CNAM query to a recipient device as a Short Message Service (SMS) message, and instruct the terminating carrier to send the same incoming call page to the recipient device after the result has been sent; and a recipient device configured to receive the SMS message and display the result of the CNAM query from the SMS message when the same incoming call page is received as part of an incoming call sequence for the same incoming call page after receiving the SMS message and after storing the result from the SMS message in a contact directory.

15. The system of claim 14, wherein the component sends a data message to the recipient device using a Short Message Service Center (SMSC), the data message includes the result of the performed CNAM query.

16. The system of claim 15, further comprising a component located on the recipient device configured to display the CNAM query result.

17. The system of claim 15, wherein the component configured to perform the caller name (CNAM) query receives confirmation that the sent data message has been received, and instructs the terminating carrier to release the same incoming call page to the recipient device after receipt of the confirmation.

18. The system of claim 14, wherein the component configured to perform the caller name (CNAM) query comprises a Line Information Database (LIDB) that includes CNAM information.

19. The system of claim 14, further comprising a component located on the recipient device configured to store the result of the performed CNAM query on the recipient device.

* * * * *